United States Patent [19]

Kanchiku et al.

[11] Patent Number: 4,594,624
[45] Date of Patent: Jun. 10, 1986

[54] MAGNETIC TAPE RECORDING AND/OR REPRODUCING APPARATUS WITH VARIABLE CAPSTAN TORQUE TRANSMISSION MEANS

[75] Inventors: Hiroshi Kanchiku; Jiro Kajino, both of Neyagawa; Fuminari Saito, Hirakata, all of Japan

[73] Assignee: Matsushita Electric Industrial Co., Ltd., Osaka, Japan

[21] Appl. No.: 447,619

[22] Filed: Dec. 7, 1982

[30] Foreign Application Priority Data

Dec. 9, 1981 [JP] Japan .................. 56-199265
Dec. 18, 1981 [JP] Japan .................. 56-205475
Jan. 7, 1982 [JP] Japan .................. 57-1457

[51] Int. Cl.$^4$ .................. G11B 5/016; G11B 5/027; G11B 5/008; G11B 17/00
[52] U.S. Cl. .................. 360/90; 360/85; 360/95; 360/96.1; 360/96.4; 242/199
[58] Field of Search .................. 360/90, 93, 94, 95, 360/96.1, 96.3, 96.4, 85; 242/199

[56] References Cited

U.S. PATENT DOCUMENTS

| | | | |
|---|---|---|---|
| 4,031,556 | 6/1977 | Ban et al. | 360/96.4 |
| 4,149,202 | 4/1979 | Terada et al. | 360/96.3 |
| 4,437,129 | 3/1984 | Yoshida et al. | 360/85 |

FOREIGN PATENT DOCUMENTS

| | | | |
|---|---|---|---|
| 0087952 | 9/1983 | European Pat. Off. | 360/85 |
| 1215011 | 4/1960 | France | 360/95 |
| 53-125805 | 11/1978 | Japan | 360/90 |
| 54-2183 | 2/1979 | Japan | 360/95 |
| 55-84063 | 6/1980 | Japan | 360/96.1 |
| 55-87338(A) | 7/1980 | Japan | 360/95 |
| 57-64359(A) | 4/1982 | Japan | 360/85 |
| 57-103154(A) | 6/1982 | Japan | 360/95 |
| 58-147837(A) | 9/1983 | Japan | 360/95 |

Primary Examiner—John H. Wolff
Assistant Examiner—Alfonso Garcia
Attorney, Agent, or Firm—Wenderoth, Lind & Ponack

[57] ABSTRACT

A small-sized and low-power magnetic tape recording and/or reproducing apparatus. A first idler is press-contacted with a driving roller provided coaxially with a capstan shaft for transporting a magnetic tape at a constant speed, the pressing force of the first idler being changed so as to obtain a driving force caused by friction according to the pressing force. The driving force of the first idler is transmitted to a relay wheel via a timing belt mounted on the first idler and the relay wheel, and to a reel drive turntable by a reel transmission mechanism. The reel transmission mechanism has a selective transmission mechanism which transmits the rotation of the relay wheel to a rotating wheel juxtaposed with the reel drive turntable and then to the reel drive turntable either directly or indirectly via a torque limiter provided on the rotating wheel.

3 Claims, 3 Drawing Figures

MAGNETIC TAPE RECORDING AND/OR REPRODUCING APPARATUS WITH VARIABLE CAPSTAN TORQUE TRANSMISSION MEANS

BACKGROUND OF THE INVENTION

1. Field of the Invention

This invention relates to a one motor drive type magnetic tape recording and/or reproducing apparatus using one motor for driving a reel drive turntable as well as a capstan shaft.

2. Description of the Prior Art

Recently, magnetic tape recording and reproducing apparatus, especially portable types, have been keenly desired to be small-sized, lightweight, and to have a low power consumption. Conventionally, each part has been made smaller in thickness so as to be small-sized and lightweight and the use of a rare-earth magnet for the magnet of the motor has saved electric power, thereby meeting the above requirement. Such methods, however, cannot be said to be suitable from the standpoint of the reliability and cost. Also, wide use of a solenoid or motor, especially one having a large weight and power consumption has limited the size and weight reduction and power saving.

SUMMARY OF THE INVENTION

An object of the invention is to provide a magnetic tape recording and/or reproducing apparatus which can easily save electric power and which is small-sized and lightweight.

A further object of the invention is to provide a magnetic tape recording and/or reproducing apparatus adapted to appropriately change the load applied to the motor corresponding to a driving force necessary for each reel drive turntable.

Still another object of the invention is to provide a thin magnetic tape recording and/or reproducing apparatus in which parts for driving reel drive turntables, such as torque limiters or the like, are juxtaposed.

These and other objects and features of the invention will become more apparent from the following detailed description taken together with the accompanying drawings.

DESCRIPTION OF THE PREFERRED EMBODIMENT

Figure 1:
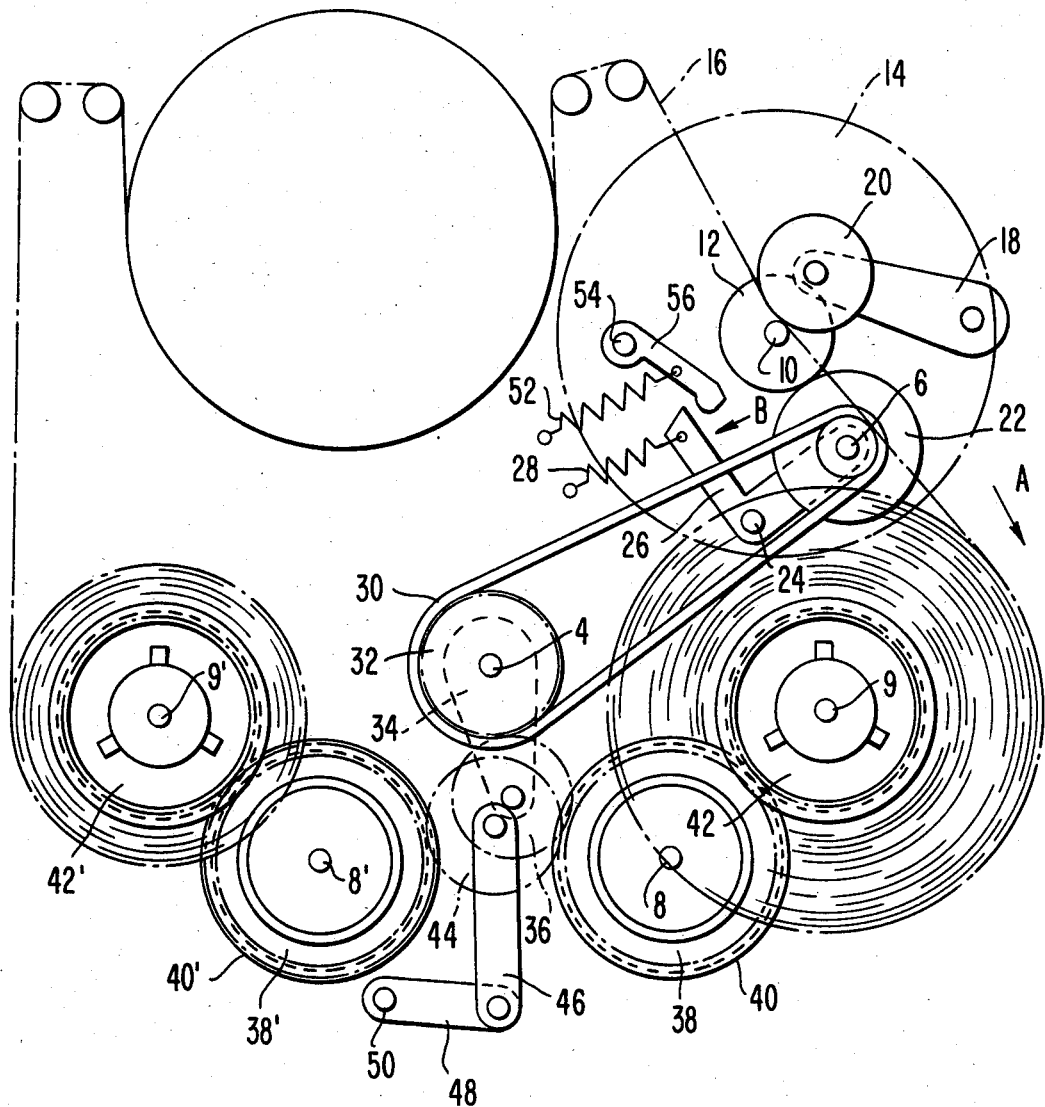
FIG. 1 is a plan view of an embodiment of a magnetic tape recording and/or reproducing apparatus of the invention, showing the principal portions in position for transporting a magnetic tape at constant speed.
Figure 2:
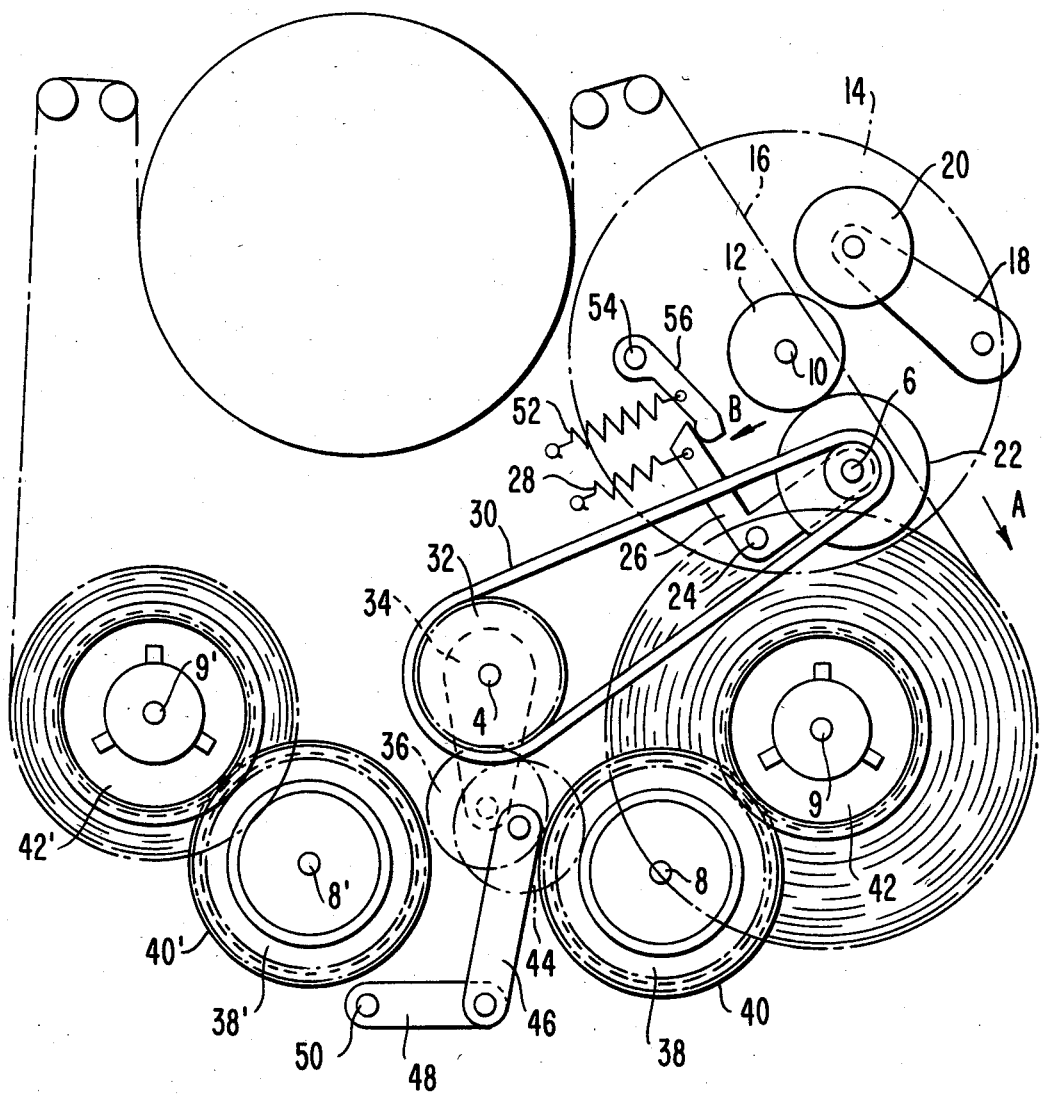
FIG. 2 is a plan view of a principal portion of the apparatus of FIG. 1 embodiment, showing parts in position for transportation of the magnetic tape driven by a reel drive turntable.
Figure 3:
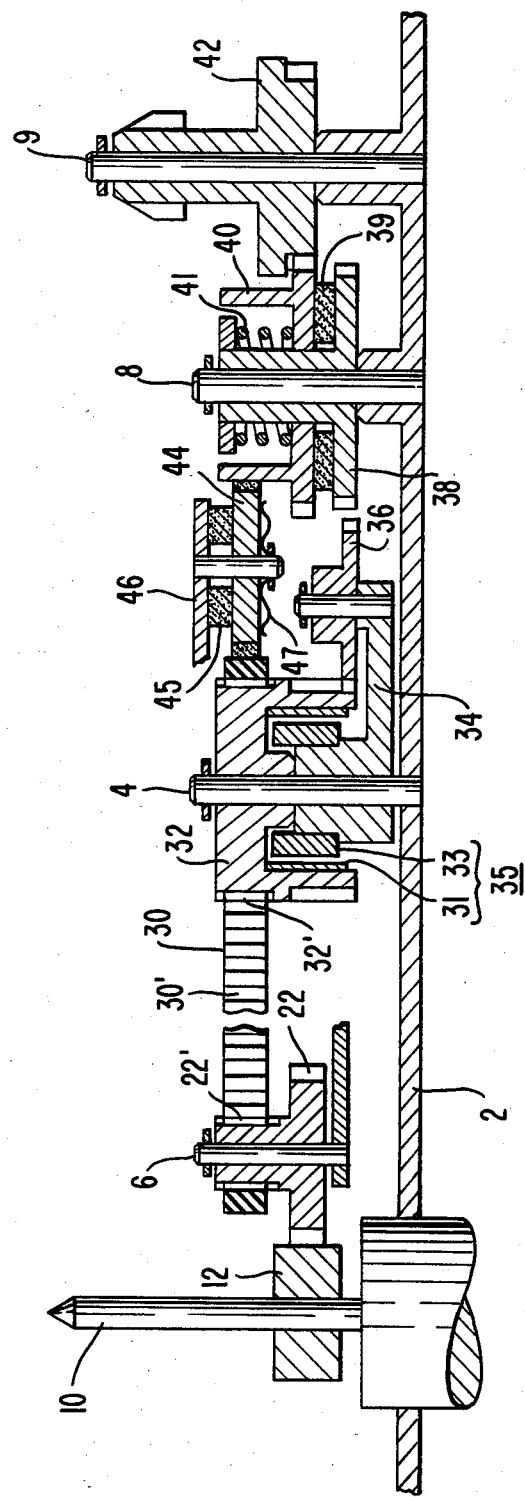
FIG. 3 is a sectional view of a principal portion of the FIG. 1 embodiment.

Referring to FIGS. 1 through 3, a capstan shaft 10 which is an extension of a motor shaft has a driving roller 12 mounted coaxially thereon, and is adapted to be rotated by a motor 14. A pinch roller 20 supported rotatably on a freely turnable lever 18 is adapted to press a magnetic tape 16 against the capstan shaft 10, with the magnetic tape 16 sandwiched between the capstan shaft 10 and the pinch roller 20 so as to be fed at constant speed. An idler 22 having at the outer periphery thereof a member, such as rubber, with a high friction coefficient, is rotatably mounted on one end of a lever 26 turnable around a shaft 24, these elements constituting idler means, and urged into press contact with the outer periphery of the driving roller 12 by pressing means in the form of a spring 28 connected to the other end of lever 26. The idler 22 also has teeth 22' on the outer periphery of the hub thereof, to transmit a driving force through transmission means in the form of a timing belt 30 and a relay element, here shown in the form of a gear 32 rotatably mounted on a shaft 4 mounted a chassis 2, and a transmitting means constituted by arm 34, turn contact unit 35, and rotating elements here shown in the form of idler gear 36, limiter gears 38 and 38', idler gears 40 and 40' and idler 44. The timing belt 30 has teeth 30', engageable with the teeth 22' of the idler 22, on the inner surface thereof. The relay gear 32 also has teeth 32', engageable with the teeth 30' of the timing belt 30, on the outer periphery portion. Because of the engagement of the teeth 30' with the teeth 22' and the initial tension of the timing belt 30 can be set very low. Hence, the torque loss at the shafts 6 and 4 supporting the idler 22 and the relay gear 32 respectively and the rotation of idler 22 is transmitted to the relay gear 32 without slipping. The base end of an arm 34 is supported coaxially with the relay gear 32 by the shaft 4, the relay gear 32 and arm 34 being coupled magnetically in non-contact relation by means of a turn-contact unit 35 comprising a hysteresis material 31 fixed to the inner periphery of a flange depending from relay gear 32 and an annular magnet 33 fixed to a hub on the arm 34 and circumferentially opposite to the hysteresis material 31. Hence, the arm 34 turns in the same direction as the direction of rotation of the relay gear 32, so that an idler gear 36, which is supported rotatably on the outer end of arm 34 and is engaged with the relay gear 32, transmits the rotation of gear 32 to either a limiter gear 38 or limiter gear 38' mounted on shaft 8 or 8' on chassis 2 to thereby rotate in the direction of rotation of relay gear 32. The limiter gears 38 and 38' have reel idler gears 40 and 40' thereon respectively, the idler gears 40 and 40' being coaxial with the limiter gears 38 and 38' respectively and frictionally coupled therewith by means of coil springs 41 through a torque limiter means in the form of felt members 39 respectively so that the limiter gears 38 and 38', even when torques above predetermined values are applied, are adapted to transmit no excessive driving force to the idler gears 40 and 40' respectively, the reel idler gears 40 and 40' engaging at the outer peripheral teeth thereof with rotatable reel drive turntables 42 and 42' mounted on shafts 9 and 9' on chassis 2 and each having teeth on the outer periphery, and the reel drive turntable 42 and 42' engaging with a reel (not shown) for taking up the magnetic tape 16.

In FIG. 1, which shows the play mode, in order to take up the magnetic tape 16 transported in the direction of the arrow A by the capstan shaft 10 and pinch roller 20 tightly on the reel drive turntable 42, the reel drive turntable 42 has to be rotated at a circumferential speed which is always higher than the transport speed of magnetic tape 16 by the capstan shaft 10 and pinch roller 20. Therefore, a difference between the number of rotations for rotating reel drive turntable 42 and the number of its actual rotations for taking up the magnetic tape 16 is accommodated by slippage between the limiter gear 38 and the idler gear 40. Hence, the press-contacting force of idler 22 generated by the spring 28 is so set that a transmitting torque larger than the value of the slip torque between the limiter gear 38 and the reel idler gear 40, the value being in terms of the torque at idler 22, is obtained.

FIGS. 2 and 3 show a state in which the magnetic tape 16 is being taken up by the reel drive turntable 42 directly rather than through the capstan shaft 10 and pinch roller 20. In this state, a turn-contact idler 44 is held rotatably in contact with the timing belt 30 extending around the outer periphery of relay gear 32 for transmitting the rotation of driving wheel 12 to the relay gear 32. The turn-contact idler 44 is also rotatably mounted on a lever 46 through a friction member comprising a felt member 45 and a flat spring 47, the lever 47 being mounted on the end of a turntable arm 48. The arm 48 is constructed to be turntable around a shaft 50 and is supported in a position where the turn-contact idler 44 is not in contact with the outer peripheries of all the reel idler gears 40 and 40' and the belt 30 in the mode for transporting the magnetic tape 16 by the capstan shaft 10 and the pinch roller 20 as shown in FIG. 1. However, in the mode of taking up the magnetic tape 16 only by the reel drive turntable 42 or 42', as shown in FIG. 2, the arm 48 supporting the turn-contact idler 44 turns by a spring (not shown) counterclockwise around the shaft 50 so that the turn-contact idler 44 contacts with the outer surface of the timing belt 30 and press-contacts with the reel idler gear 40 or 40' which corresponds to the moving direction of the timing belt 30, through the frictional resistance of the friction member comprising the felt 45 and the spring 47. Hence, the rotation of relay gear 32 is transmitted to the reel idler gear 40 or 40', thereby driving the reel drive turntable 42 or 42' directly rather than through the limiter means comprising the limiter gear 38 or 38', the felt 39 and the spring 41. In this state, the idler gear 36 is kept in an idle position where it is not in contact with either limiter gear 38 or limiter gear 38'. The arm 34 and idler gear 36 and arms 46 and 48 and idler 44 together constitute selective rotating means.

Referring to FIG. 2, the rotation of idler 22 in press-contact with the driving wheel 12 rotating clockwise is transmitted to the reel idler gear 40 through the turn-contact idler 44 in press-contact with the outer surface of the timing belt 30 and the outer periphery of the reel idler gear 40, thereby causing the reel drive turntable 42 to rotate clockwise and take up the magnetic tape 16. In such a mode (fast-forward mode), since the reel drive turntable 42 directly takes up the magnetic tape 16, the load in the reel drive turntable increases, whereby the take-up torque of the reel drive turntable 42 needs sufficient torque generated for driving the reel drive turntable 42, regardless of the diameter of the magnetic tape 16 wound on the take-up reel. In the vicinity of the lever 26 holding the idler 22 is positioned pressure force changing means in the form of an auxiliary lever 56 which is urged by an auxiliary spring 52 to generate a rotational force clockwise around a shaft 54. The auxiliary lever 56, in the mode of transporting the magnetic tape 16 by the capstan shaft 10 and the pinch roller 20 as shown in FIG. 1, is held turned counterclockwise and free from the lever 26 by using a known member (not shown) which moves according to the mode of the apparatus. However, in the mode of taking up the magnetic tape 16 only by the reel drive turntable 42, as shown in FIG. 2, the auxiliary lever 56 is caused to turn clockwise in the figure, thereby giving to the lever 26 a force acting thereon in the direction of the arrow B.

In other words, the press-contacting force to urge the idler 22 against the driving roller 12 is generated by the spring 28 and the auxiliary spring 52 and the press-contacting force generates a frictional force between idler 22 and driving roller 12. The tension of each of the spring 28 and the auxiliary spring 52 is set so that the transmitting torque from the driving roller 12 to the idler 22, which is generated by the frictional force between the idler 22 and the driving roller 12, when converted into the torque of the reel drive turntable 42, reaches a value sufficient for driving the reel drive turntables and sufficient tension regardless of the diameter of wound magnetic tape 16. Accordingly, the rotary fore of driving roller 12 is transmitted to the reel drive turntable 42 without slipping, so that the magnetic tape 16 is taken on to a take-up reel (not shown) at speed corresponding to the number of rotations of the driving roller 12.

As seen from the above, in the magnetic tape recording and/or reproducing apparatus of the invention the press-contacting force of the idler 22 with respect to the driving roller 12 can be changed depending on the transportation mode of the magnetic tape 16, thereby being very advantageous in eliminating the deformation of the idler 22 and a loss of the motor 14 caused by a lateral pressure against the driving roller 12 rotated by the motor 14 in comparison with conventional methods of always applying the maximum press-contacting force to the idler within the range of the necessary press-contacting force, thus having high reliability and high quality.

Also, the use of the aforesaid timing belt according to the invention, in comparison with conventional flat belts depending only on friction between a belt and a pulley, not only can transmit the rotational force in synchronism and without slipping, but also exert the transmitting torque independent of the initial tension, whereby the initial tension of the timing belt 30 is scarcely needed and the rotary shafts 4 and 6 of the idler 22 and gear wheel 32 subjeted to extremely small lateral pressure. Therefore, the magnetic tape recording and/or reproducing apparatus of the invention can of course have high reliability and high quality due to reduction of the loss in transmitting torque. Since the idler 22 has a rubber ring provided around its outer periphery, the idler 22 can transmit the rotational driving force from the driving roller 12 silently. Also, since the turn-contact idler 44 abuts against the rear of the timing belt 30 for transmitting the rotation therefrom, the magnetic tape recording and/or reproducing apparatus of the invention can be easily constructed which extremely reduces the vertical space needed and become smaller in thickness.

Furthermore, the reel drive turntable 42 and the torque limiter means comprising a limiter gear 38, a felt member 39, a reel idle gear 40 and a coil spring 41 are not integrated coaxially, but are juxtaposed independently of each other, whereby not only the reel drive turntables can be designed to be smaller in thickness, but also each torque limiter means can be disposed with a circular arc of a radius equal to the interval between the shafts 8, 8' of the limiter and the shafts 9, 9' of the reel drive turntable, respectively, whereby a large degree of freedom can be given to the construction of reel drive turntable drive mechanism in the magnetic tape recording and/or reproducing apparatus of the invention.

While a preferred embodiment of the invention has been described using specific terms, such description is for illustrative purpose only, and it is to be understood that changes and variations may be made without departing from the spirit or scope of the following claims.

What is claimed is:

1. A magnetic tape recording and/or reproducing apparatus comprising:
   a motor;
   a capstan shaft rotated by said motor;
   a pinch roller for pressing a magnetic tape against said capstan shaft for causing said capstan to transport the magnetic tape at constant speed;
   a driving roller mounted coaxially with said capstan shaft and rotatable with said capstan shaft;
   an idler means pressed against said driving roller in frictionally engaging relationship with said driving roller for transmitting a rotational force from said driving roller to said idler means;
   a pair of reel drive turntables;
   a transmissin means for transmitting rotation of said idler means to each of said pair of reel drive turntables for taking-up thereon said magnetic tape, said transmission means comprising a relay element rotatably drivingly interconnected with said idler means and being rotated by said idler means and a transmitting means connected to said relay element for selectively transmitting rotation of said relay element to one of said pair of reel drive turntables;
   a pressing means connected with said idler means and generating a pressure force for pressing said idler means against said driving roller; and
   a pressure force changing means engageable with said pressing means for changing said pressure force generated by said pressing means to change said rotational force from said driving roller to said idler means selectively according to the operating mode of said apparatus.

2. A magnetic tape recording and/or reproducing apparatus according to claim 1, wherein said idler means has an idler having teeth on the outer periphery thereof, and wherein said relay element has teeth on the outer periphery thereof, and said transmission means further includes a timing belt having teeth on the inner periphery thereof engaged with said teeth of said idler means and said relay wheel for transmitting rotation of said idler means to said relay element, and said transmitting means comprises a selective rotation-transmitting mechanism in contact with the surface of said timing belt opposite to the surface having said teeth and for transmitting rotation of said relay element selectively to one of said pair of reel drive turntables according to the direction of rotation of said relay wheel, so that the rotation of said capstan shaft is transmitted by said idler means and said transmission means to one of said pair of reel drive turntables according to the direction of rotation of said capstan shaft.

3. A magnetic tape recording and/or reproducing apparatus according to claim 1, wherein said transmitting means has a pair of first rotating elements disposed in the vicinity of respective ones of said pair of reel drive turntables and out of engagement with said pair of reel drive turntables, a pair of second rotating elements which are engaged with respective ones of said pair of reel drive turntables and being capable of transmitting rotation thereto directly, and disposed coaxially with corresponding ones of said pair of first rotating elements and rotatable independently thereof, a torque limiter means interposed between each pair of corresponding first and second rotating elements for the limiting rotational force which is transmitted from the first rotating element to the corresponding reel drive turntable through said torque limiter means and the corresponding second rotating element, and a selective rotating means connected between said relay element and said pairs of corresponding first and second rotating elements for selectively rotating either one of the pairs of corresponding first and second rotating elements by said relay element, whereby different driving forces can be transmitted to said pair of reel drive turntables.

* * * * *